United States Patent
Hurst

(10) Patent No.: US 6,834,107 B1
(45) Date of Patent: Dec. 21, 2004

(54) TELEPHONE APPARATUS

(75) Inventor: Jeffrey Hurst, Guildford (GB)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/361,986

(22) Filed: Jul. 28, 1999

(30) Foreign Application Priority Data

Jul. 29, 1998 (GB) .............................................. 9816547

(51) Int. Cl.⁷ .............................................. H04M 9/00
(52) U.S. Cl. ........................... 379/390.01; 379/373.01; 455/567
(58) Field of Search ................................. 381/317, 101, 381/102, 103, 104, 107, 91, 56–57; 379/388.03, 390.01, 390.03, 392.01, 372, 373.01–373.02; 455/567

(56) References Cited

U.S. PATENT DOCUMENTS

| | | | |
|---|---|---|---|
| 4,628,526 A | | 12/1986 | Germer |
| 4,829,565 A | | 5/1989 | Goldberg |
| 4,908,855 A | | 3/1990 | Ohga et al. |
| 5,553,134 A | | 9/1996 | Brandon et al. |
| 5,722,086 A | | 2/1998 | Bonet et al. |
| 5,896,450 A | | 4/1999 | Kurihara |
| 5,907,823 A | * | 5/1999 | Sjoberg et al. |
| 6,094,481 A | * | 7/2000 | Deville et al. |
| 6,134,455 A | * | 10/2000 | Corkum |

FOREIGN PATENT DOCUMENTS

| | | |
|---|---|---|
| EP | 0299507 A | 1/1989 |
| EP | 0661858 A | 7/1995 |
| EP | 0 682 437 A2 | 11/1995 |
| EP | 0717547 A | 6/1996 |
| EP | 0 763 888 A2 | 3/1997 |
| EP | 0767570 A | 4/1997 |
| GB | 2 308 932 A | 7/1997 |
| WO | 97/33419 | 9/1997 |

OTHER PUBLICATIONS

2–117228, May 1, 1990—Japanese Patent Abstract"Portable Mobile Telephone Set For Vehicle".
08321872 A, Dec. 3, 1996—Japanese Patent Abstract "Surrounding Noise Suppressing Device For Hands–Free–Type Voice Communication Terminal Equipment".
2–250455 (a), Oct. 8, 1990—Japanese Patent Abstract "Speaker Sound Volume Variable System For Telephone Set".
07231276 A, Aug. 28, 1995—Japanese Patent Abstract "Portable Radio Telephone Set".
5–110637 (a), Apr. 30, 1993—Japanese Patent Abstract "Telephone Set".
08251259 A, Sep. 27, 1996—Japanese Patent Abstract "Radio Terminal Equipment".
3–21142 (A), Jan. 29, 1991—Japanese Patent Abstract "Radio Telephone System".
08265075 A, Oct. 11, 1996—Japanese Patent Abstract "Telephone Set".
International Search Report dated Jun. 12, 1999.

* cited by examiner

Primary Examiner—Duc Nguyen
(74) Attorney, Agent, or Firm—Potomac Patent Group, PLLC

(57) ABSTRACT

The volume of a loudspeaker in a telephone is automatically adjusted according to the ambient noise at the telephone location. During a predetermined time window which exists during the initial period of a telephone call, the ambient noise is measured, and the volume of the loudspeaker adjusted accordingly. For example, the time period may exist between the time when the telephone goes off-hook, until the time when the handset is placed near the ear. Adjusting the ambient noise during this period has the advantage of not having to filter out the user's speech, as would be the case when measuring the ambient noise while the user is speaking. Furthermore, there is no requirement for circuitry which detects gaps in speech.

39 Claims, 4 Drawing Sheets

TELEPHONE APPARATUS

FIELD OF THE INVENTION

The invention relates to a method and a circuit arrangement for automatically adjusting the volume of a loudspeaker in a telephone in response to ambient noise levels, and in particular to the ambient noise measured during the initial dead time of a telephone call.

BACKGROUND OF THE INVENTION

When making or answering a telephone call, the background noise at the subscriber's location is often intrusive and does not permit the subscriber to hear what the other subscriber is saying. Additionally, the volume of speech from the handset can be intrusive in quiet environments. This problem is particularly relevant to mobile phones which, by their very nature, may be used in a diverse range of locations.

Consider the case of a phone call being made from a church to a building site. When the call is made from the phone (in the church for instance), very little background noise exists, and the volume of the phone should ideally be turned down accordingly, so that the voice of the other subscriber does not echo around the church. When the call is received at the building site, a large amount of background noise exists, and the volume of the phone should ideally be turned up to compensate, avoiding the problem of having to find a quiet area to hear a received call.

Various systems have been designed to overcome this problem by adjusting the volume of a loudspeaker in a telephone in response to ambient noise detected in the vicinity of the telephone.

The simplest of these have manual buttons for adjusting the volume according to the background noise. These have the disadvantage of requiring the caller to manually adjust the volume during a call. This can be cumbersome, particularly on a mobile phone. In addition, until such time as the volume is adjusted, there will be a period during which the volume will be at an undesirable level.

Another known method is to automatically measure the ambient noise, and automatically adjust the loudspeaker volume accordingly. With such methods, it is important that the ambient noise is not detected at times when the user is speaking, so that the speaker's voice does not corrupt the measured ambient noise level. To overcome this problem, these systems must measure the ambient noise during gaps in speech, and then adjust the volume of the telephone's loudspeaker in relation to the ambient noise measured in these gaps.

FIG. 1 shows the steps involved in adjusting the loudspeaker volume in this type of system. A speech detector continually monitors the speech for any gaps, as shown in steps S1 and S2. When a gap is detected, the ambient noise level is measured in step S3. The volume of the loudspeaker is then adjusted automatically in step S4 in response to the measured ambient noise.

This type of system has the disadvantage of requiring complex speech detectors, implemented either in hardware or software, to determine when the gaps in speech exist.

Other known systems adjust the volume continuously throughout the duration of a telephone call, by continuously measuring the ambient noise, regardless of whether the user is speaking. Such systems have the disadvantage of requiring complex algorithms to compensate or cancel the user's voice signal from the measured ambient noise.

The aim of the present invention is to overcome these disadvantages of automatically adjusting the volume of a loudspeaker in response to ambient noise, by measuring the ambient noise at a predetermined time when it is known that there will be no speech.

SUMMARY OF THE INVENTION

According to the first aspect of the invention, there is provided a method of automatically adjusting the volume of a loudspeaker in a telephone according to the ambient noise at the telephone location, wherein the method comprises the steps of defining a predetermined time window which exists during the initial period of a telephone call, measuring the ambient noise during the predetermined time window, and adjusting the volume of the loudspeaker in relation to the measured ambient noise.

According to a second aspect of the invention, there is provided a circuit arrangement for automatically adjusting the volume of a loudspeaker in a telephone in relation to the ambient noise at the telephone location, wherein the circuit arrangement comprises means for defining a predetermined time window which is triggered by a predetermined signal at the beginning of a telephone call, means for measuring the ambient noise during the predetermined time window, and means for adjusting the volume of the loudspeaker in relation to the measured ambient noise.

BRIEF DESCRIPTION OF THE DRAWINGS

For a better understanding of the present invention reference will now be made, by way of example, to the accompanying drawings, in which.

DESCRIPTION OF A PREFERRED EMBODIMENT OF THE INVENTION

Figure 1:
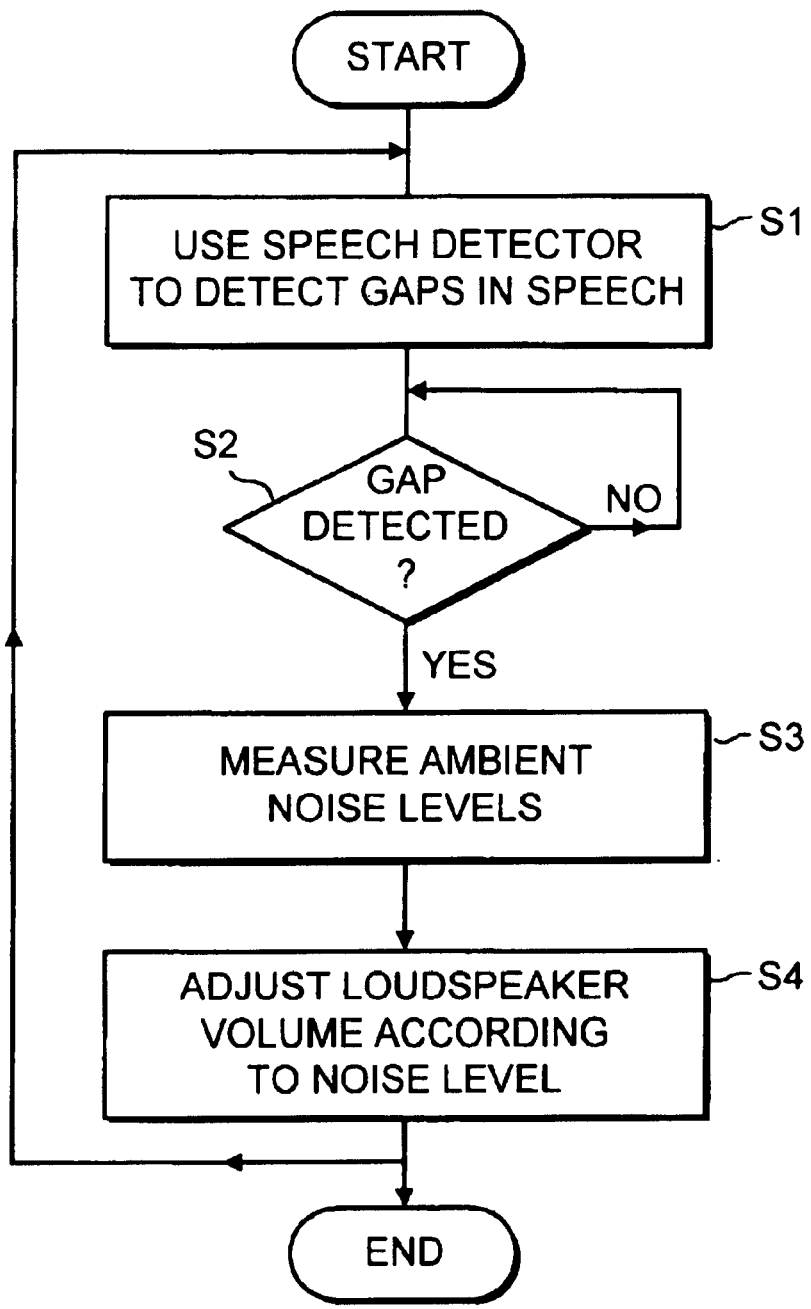
FIG. 1 shows a method of adjusting loudspeaker volume according to the prior art.
Figure 2:
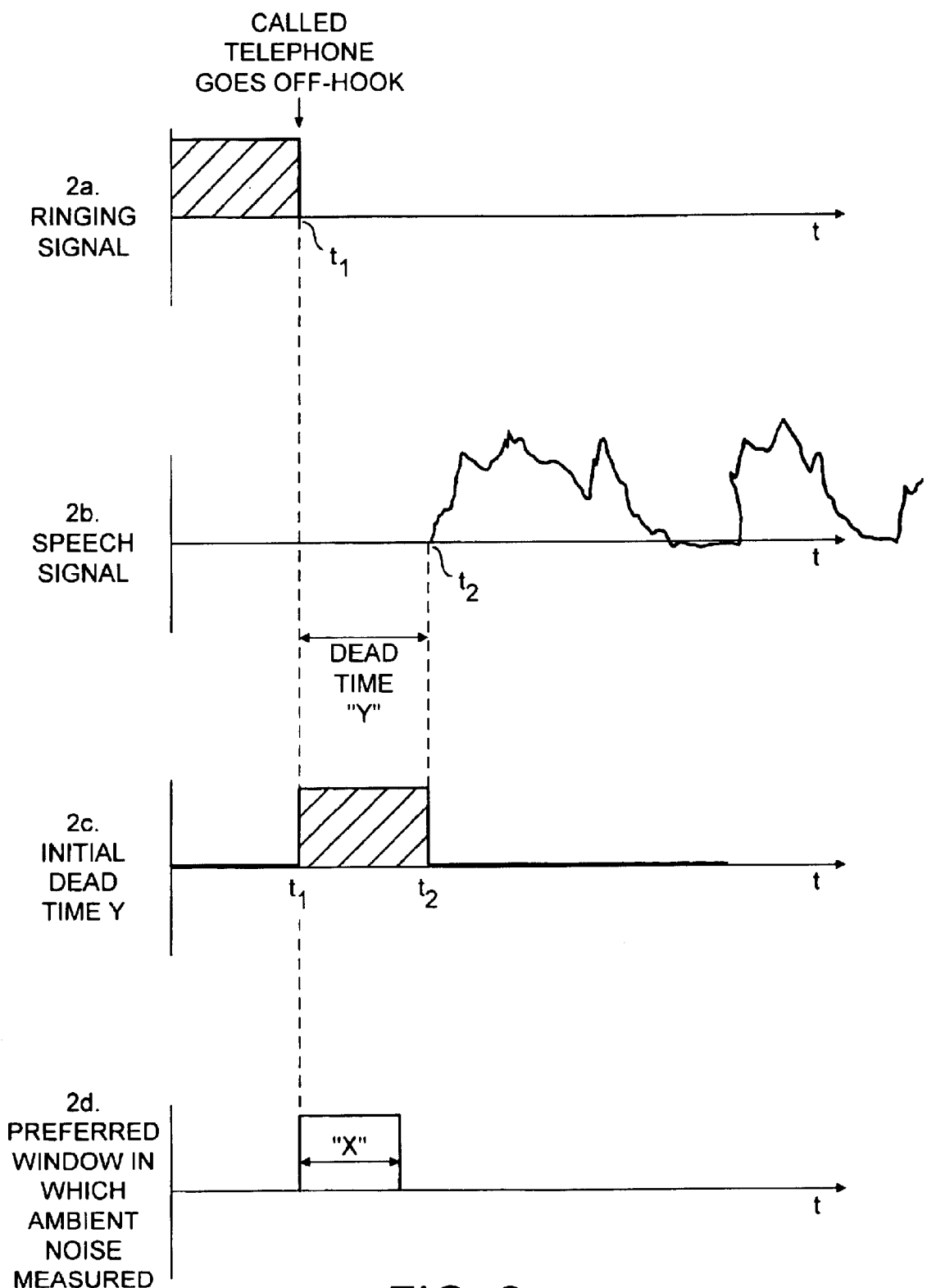
FIGS. 2a to 2d show the signals present during the initial stages of a telephone call at a called telephone set.

FIGS. 2a–2d show the various signals which are present during the initial stages of receiving and answering a telephone call at a called telephone set. In response to a ringing signal shown in 2a, the called party answers the call at time $t_1$. This can be accomplished by either lifting the handset in a conventional telephone, or by accepting the call in a mobile phone, for example by pressing the "receive" key. From the time when the handset of a conventional telephone is first taken off-hook, or the mobile phone is first turned on to accept an incoming call, there will inevitably be at least a few milliseconds during which the phone is operational, but the person answering the call has not spoken. This corresponds to the time it takes the called person to raise the telephone handset to the proximity of the ear. The called person does not speak until time $t_2$ shown in FIG. 2b. Thus, there is a period of dead-time Y which exists between times t1 and t2, as shown in FIG. 2c. Typically, there will be a minimum delay of approximately 500 milliseconds before the user speaks.

This delay of typically 500 milliseconds is due to the speed of reaction of a human being in speaking after picking up the handset. With mobile phones, they have to be held in front of the user to be turned on, then moved up to the side of the user's head before the user can hear. The operation of mobile phones in this manner is such that there will always be this period of initial dead-time Y during which the ambient noise can be measured.

Although the ambient noise may be measured at any time during this dead-time Y, it is preferably measured during at least a part of a time window X shown in FIG. 2d, whereby X is typically 200 milliseconds, ie. less than the known dead-time Y. In this way, an element of safety margin is built into the system.

Figure 3:
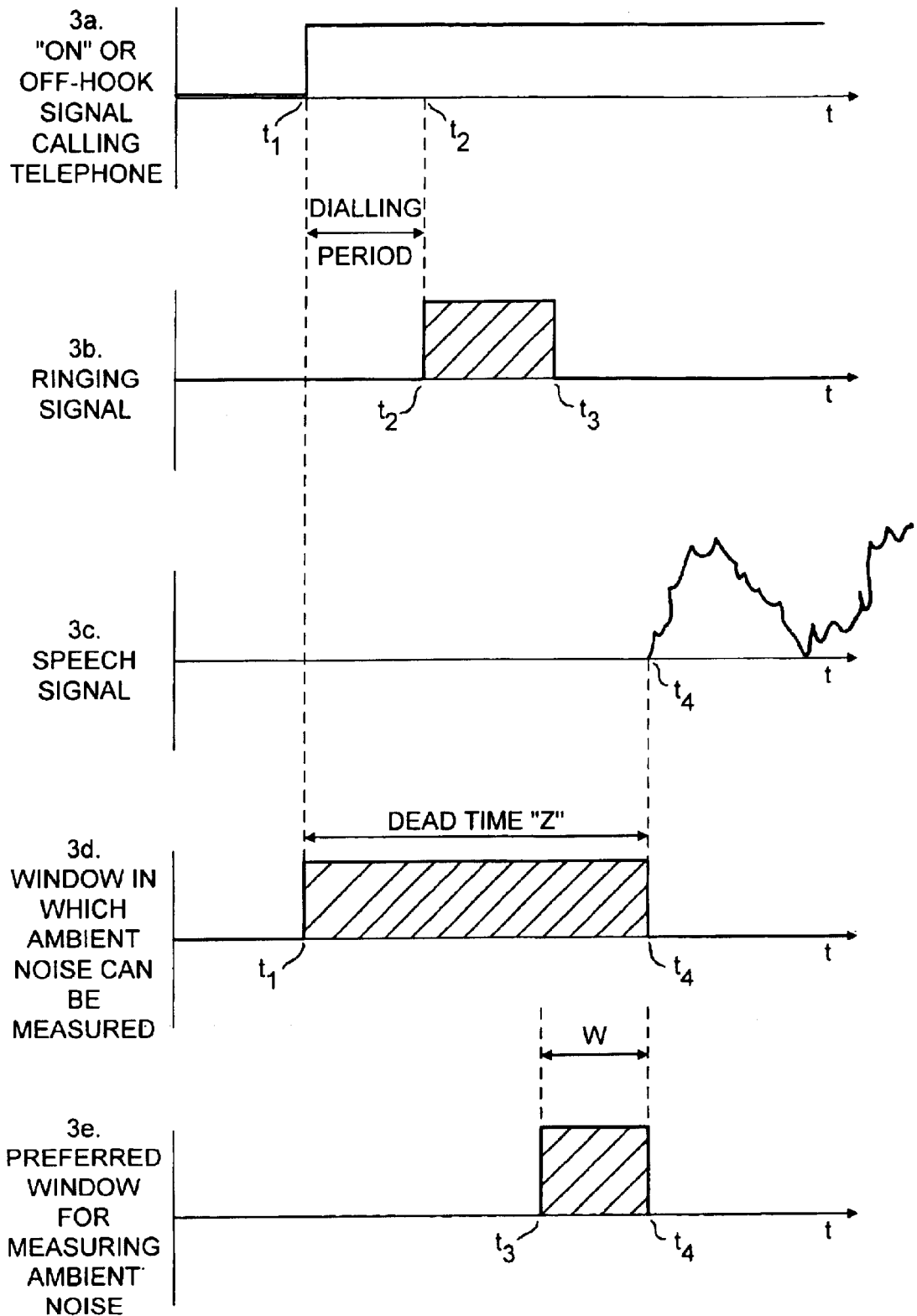
FIGS. 3a to 3e show the signals present during the initial stages of a telephone call at a calling telephone set.

FIGS. 3a to 3e show the signals which are present during the initial stages of a telephone call at a calling telephone set. The user turns on the mobile telephone, or lifts the receiver of a conventional telephone at time $t_1$ as shown in FIG. 3a. After the user has dialled the telephone number, the ringing signal will begin at time $t_2$, and end at time $t_3$ corresponding to the time at which the called party answers the telephone, FIG. 3b. FIG. 3c shows that the called party will not speak until time $t_4$, which again is typically 500 milliseconds after $t_3$. As mentioned above, this corresponds to the time taken by the called party to answer the call and raise the handset to the ear.

Since the calling telephone becomes operational at point $t_1$, it is possible to measure the ambient noise during the period Z (shown in FIG. 3d). This corresponds to the initial dead-time between the telephone being made operational and the called party speaking.

Preferably, the ambient noise is measured at the calling telephone during at least a part of the time window W shown in FIG. 3e. This corresponds to the time from which the called party answers the call, until the called party speaks. This avoids the possibility of the ambient noise measurement being corrupted between times $t_1$ and $t_3$, which may occur if the calling party speaks while dialling or waiting for the called party to answer.

However, the ambient noise could be measured at the calling telephone during any window between times $t_2$ and $t_4$. The dialling operation ends at time $t_2$, which means that the "bleeps" that are generated when dialling, will not corrupt the ambient noise measurements. Any ringing tone measured during this period can be easily removed, since this is also generated in the calling phone.

Figure 4:
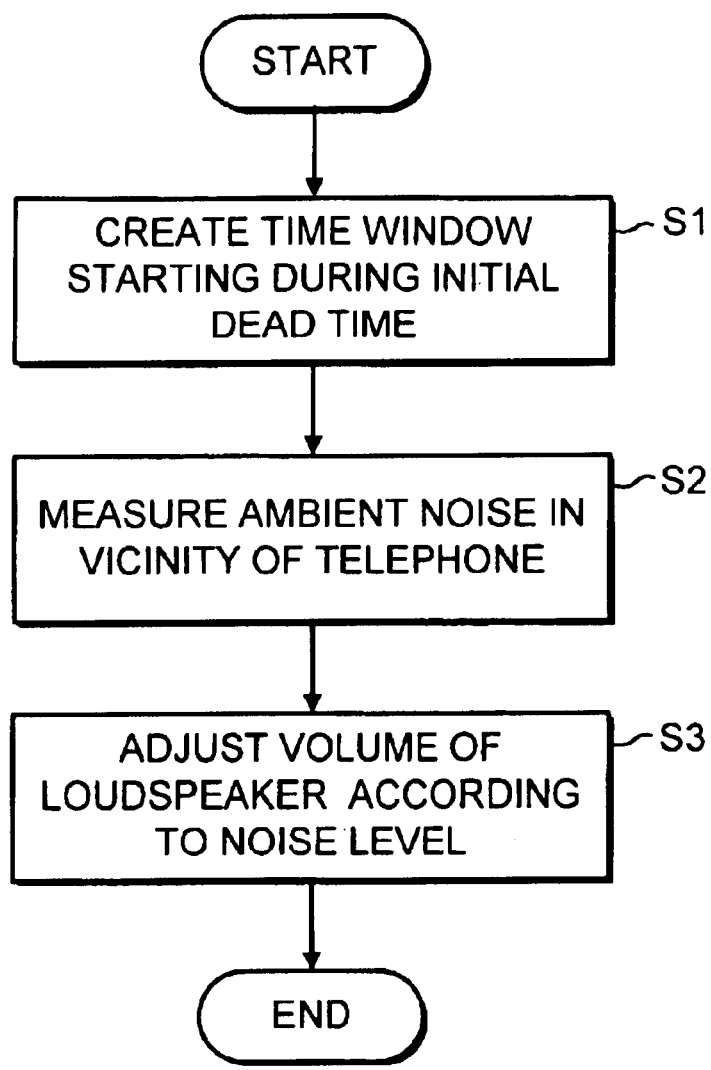
FIG. 4 shows a method of adjusting the loudspeaker volume according to the present invention.

FIG. 4 shows the steps involved in adjusting the volume of the telephone. A time window in defined in step S1 at a predetermined time described above in relation to FIGS. 2a–2d and 3a–3e. The ambient noise is then measured during this time window, S2, and the volume of the loudspeaker adjusted accordingly, S3. If little or no background noise is detected, then the volume of the phone is turned down. If background noise over a certain threshold is detected, then the volume is turned up. Preferably, the volume is adjusted in proportion to the background noise.

Some digital telephones have circuitry for generating "comfort noise" during silent intervals. This comfort noise is intended to reassure the listener than the telephone line has not gone dead. In telephones having this feature, the comfort noise signal may be used to adjust the loudspeaker volume at subsequent intervals during the call. This is made possible by the fact that the comfort noise signal is only present when there is no speech. The volume adjustment function could therefore be initiated during these gaps if there is sufficient time for the ambient noise measurements to be carried out.

Preferably, the background noise should still be filtered out as much as possible using existing filtering techniques so as not to pass on much of the building site noise to the subscriber in the church for example.

The invention described above allows speech to be transmitted at a constant volume level, thus enabling the handset to remove the need for shouting in a church to make the voice be heard at a building site, and removing the need for whispering at a building site in order to not disturb a church environment.

The invention is not limited to the details described in the preferred embodiment, but may be realised using alternatives readily apparent to a person skilled in the art, within the scope of the invention as defined in the claims. For example, the solution may be implemented using either hardware or software. Also, although the invention has been described in relation to measuring noise level and adjusting the speaker volume, the invention may also measure, for example, the dynamic range of ambient noise, or adjust particular frequencies of the loudspeaker output. Also, when measuring the ambient noise during a time window, this may be an instantaneous measurement, or an average measurement taken over the period.

What is claimed is:

1. A method of automatically adjusting the volume of a loudspeaker in a telephone according to the ambient noise at the telephone location, the method comprising the steps of:

defining a predetermined time window which exists during the initial period of a telephone call;

measuring the ambient noise during the predetermined time window; and adjusting the volume of the loudspeaker in relation to the measured ambient noise;

wherein the predetermined time window is triggered in response to a call being initiated in the telephone.

2. A method according to claim 1 wherein the call is initiated in response to the pressing of a send button on the telephone.

3. A method according to claim 1 wherein the time window is triggered by the receive button of a called telephone.

4. A method according to claim 1 wherein the time window has a fixed length.

5. A method according to claim 1 wherein the time window is less than 500 milliseconds.

6. A method according to claim 1 wherein the length of the time window is set in relation to a period during which no speech is expected.

7. A method according to claim 1 wherein the volume may be further adjusted by defining a further time window, the further time window being triggered by a signal normally used to create comfort noise.

8. A method according to claim 1 wherein the dynamic range of the ambient noise is measured.

9. A method according to claim 1 wherein particular frequencies of the loudspeaker output are adjusted in accordance with the measured ambient noise.

10. A circuit arrangement for automatically adjusting the volume of a loudspeaker in a telephone in relation to the ambient noise at the telephone location, the circuit arrangement comprising:

means for defining a predetermined time window which exists during an initial period of a telephone call;

means for measuring the ambient noise during the predetermined time window; and means for adjusting the volume of the loudspeaker in relation to the measured ambient noise; and means for triggering the predetermined time window in response to a call being initiated in the telephone.

11. A circuit arrangement according to claim 10 wherein the call is initiated in response to the depressing of the "send" button on the telephone.

12. A circuit arrangement according to claim 10 wherein the time window has a fixed length.

13. A circuit arrangement according to claim 10, wherein the time window is less than 500 milliseconds.

14. A circuit arrangement according to claim 10, wherein the length of the time window is set in relation to a period during which no speech is expected.

15. A circuit arrangement according to claim 10 wherein the means for measuring ambient noise measures the dynamic range of the ambient noise.

16. A circuit arrangement according to claim 10 wherein the means for adjusting the volume of the loudspeaker includes means for adjusting particular frequencies of the loudspeaker output in accordance with the measured ambient noise.

17. A method according to claim 1, wherein the volume of a speech signal is adjusted in accordance with the measured ambient noise.

18. A method of automatically adjusting the volume of a loudspeaker in a telephone according to the ambient noise at the telephone location, the method comprising:

defining a predetermined time window which exists during the initial period of a telephone call;

measuring the ambient noise during the predetermined time window; and adjusting the volume of the loudspeaker in relation to the measured ambient noise;

wherein the predetermined time window is triggered in response to a call being answered.

19. A method according to claim 18, wherein the call is answered in response to a receive button being pressed on the telephone.

20. A method according to claim 18, wherein the call is answered in response to a receive button being pressed on a called telephone.

21. A method according to claim 18, wherein the time window has a fixed length.

22. A method according to claim 18, wherein the time window is less than 500 milliseconds.

23. A method according to claim 18, wherein the length of the time window is set in relation to a period during which no speech is expected.

24. A method according to claim 18, wherein the volume may be further adjusted by defining a further time window, the further time window being triggered by a signal normally used to create comfort noise.

25. A method according to claim 18, wherein the dynamic range of the ambient noise is measured.

26. A method according to claim 18, wherein particular frequencies of the loudspeaker output are adjusted in accordance with the measured ambient noise.

27. A method according to claim 18, wherein the volume of a speech signal is adjusted in accordance with the measured ambient noise.

28. A circuit arrangement according to claim 10, wherein the means for defining a predetermined time window includes means for defining a further time window for measuring the ambient noise, the further time window being triggered by a signal normally used to generate comfort noise.

29. A circuit arrangement according to claim 10, wherein the means for adjusting the volume of the loudspeaker includes means for adjusting the volume of a speech signal.

30. A circuit arrangement for automatically adjusting the volume of a loudspeaker in a telephone in relation to the ambient noise at the telephone location, the circuit arrangement comprising:

means for defining a predetermined time window which exists during an initial period of a telephone call;

means for measuring the ambient noise during the predetermined time window;

means for adjusting the volume of a loudspeaker in relation to the measured ambient noise; and means for triggering the predetermined time window in response to the telephone call being answered.

31. A circuit arrangement according to claim 30 wherein the telephone call is answered in response to a receive button being pressed on the telephone.

32. A circuit arrangement according to claim 30 wherein the telephone call is answered in response to a receive button being pressed on a called telephone.

33. A circuit arrangement according to claim 30, wherein the time window has a fixed length.

34. A circuit arrangement according to claim 30, wherein the time window is less than 500 milliseconds.

35. A circuit arrangement according to claim 30, wherein the length of the time window is set in relation to a period during which no speech is expected.

36. A circuit arrangement according to claim 30, wherein the means for defining a predetermined time window includes means for defining a further time window for measuring the ambient noise, the further time window being triggered by a signal normally used to generate comfort noise.

37. A circuit arrangement according to claim 30, wherein the means for measuring ambient noise includes means for measuring the dynamic range of the ambient noise.

38. A circuit arrangement according to claim 30, wherein the means for adjusting the volume of the loudspeaker includes means for adjusting particular frequencies of the loudspeaker output in accordance with the measured ambient noise.

39. A circuit arrangement according to claim 30, wherein the means for adjusting the volume of the loudspeaker includes means for adjusting the volume of a speech signal.

\* \* \* \* \*